United States Patent Office 3,845,026
Patented Oct. 29, 1974

3,845,026
NOVEL ELECTRICALLY CONDUCTIVE COMPOSITIONS
Isaac Michaeli and Shymon Reich, Rehovot, Israel, assignors to Yeda Research and Development Co., Ltd., Rehovot, Israel
No Drawing. Filed Nov. 16, 1972, Ser. No. 306,990
Claims priority, application Israel, Nov. 24, 1971, 38,221
Int. Cl. C08f 1/84, 3/76, 15/02
U.S. Cl. 260—85.5 R        6 Claims

ABSTRACT OF THE DISCLOSURE

A novel transparent elastomer comprising acrylonitrile and a substantial quantity of perchlorate hydrate or anhydrous perchlorate and water. Can be prepared so as to be rubber-like or hard; and is characterized by electrical conductivity; some of the elastomers can be used as light pipes.

PRIOR ART

From U.S. Pat. No. 2,963,457 there is known a process of preparing a solution of polymer in an aqueous medium which comprises polymerizing acrylonitrile or mixtures of same with other monomers in an aqueous solution of alkali metal or alkaline earth metal perchlorate salts in a salt to water ratio of 1:1 to 4:1, and a peroxidic catalyst. Most of the polymers obtained are soluble, the perchlorate can be leached from these by water.

DESCRIPTION OF THE INVENTION

The present invention relates to a novel elastomer and to a process for producing same. More particularly, the invention relates to a novel transparent elastomer of comparatively high electrical conductivity, which conductivity is thermally activated. According to a preferred embodiment of the invention there is provided an electrically conducting elastomer which is transparent. A specific interesting application of the novel transparent, electrically conducting elastomer is as an efficient flexible light-pipe.

Other interesting features of the novel materials according to the present invention are the combination of their electrical, mechanical and optical properties. For example, the novel materials may be used as flexible "light pipes" through which an electrical pulse may be propagated at the same time. The electrical pulse may be varied according to the intensity of the light transmitted through the light pipe. Other further features of the invention will become apparent hereinafter.

The use of the comparatively small quantities of inorganic compounds as catalysts for the polymerization of various monomers is well known. These are of course incorporated in the resultant polymers. The novel elastomers of the present invention differ from the known compositions in that they contain a certain specific inorganic component in a much higher concentration. In spite of the high concentration of the inorganic compound, a homogeneous composition of matter is obtained, and this is characterized by the above mentioned properties.

Electrically conducting elastomers are of importance and value for applications where the elastomeric properties are indispensable and where electrostatic charging is either undesirable, or even outright dangerous. As examples of such uses there may be mentioned tires of aircraft or rubber equipment in operating theaters where electrostatic charges are apt to cause explosions of the anaesthetic composition used. With airplane tires there has been made an attempt to incorporate electrically conducting carbon fillers. A further approach is the provision of electrically conducting ionenes. The novel compositions of matter according to the present invention provide an effective and convenient solution for some of these and similar problems.

After many experiments with various inorganic compounds it has been discovered that it is possible to obtain homogeneous elastomeric compositions by first preparing a mixture of acrylonitrile and hydrated perchlorate salt, if desired with one or more other monomers, the said perchlorate being at a comparatively high concentration, and by polymerizing the said mixture.

Instead of starting with hydrated perchlorate, it is possible to use the anhydrous salt and to add a suitable quantity of water. Experience has shown that it is not necessary to use fully hydrated salt, and an addition of from about 10% water results in elastomeric compositions of matter. As will become evident from the following examples, an excess over the fully hydrated salt may be advantageously used. The following examples are based on the use of hydrated perchlorates. It ought to be clearly understood that anhydrous perchlorates and water may be used instead.

The incorporation of hydrated perchlorates in the said monomer of high dielectric constant results in a composition which can be polymerized to give the desired elastomer. The criteria which appear to be of importance in this approach are:

a. A high solubility of the salt in the monomer:
b. The polymerization takes place in such manner that there is practically no phase separation and no crystallization of the salt.

According to the present invention there is provided by means of this approach, an elastomeric, rubberlike composition of matter, which is characterized by a high electrical conductivity, and by interesting optical properties.

The electrical conductivity of the novel elastomers varies between about $10^{-1}$ $\Omega^{-1}$ cm.$^{-1}$ and between about $10^{-6}$ $\Omega^{-1}$ cm.$^{-1}$, and the elasticity of the substances produced according to the present invention may be varied at will from rubber-like to a quite high tensile modulus, of about $10^9$ dyne/cm.$^2$. The dynamic relaxation may vary over a wide range of relaxation times, of from about less than 0.1 seconds to more than 100 seconds.

The novel compositions of matter are obtained by bulk polymerization of acrylonitrile to which there has been admixed a comparatively high quantity (in the order of magnitude of at least 1 M, and preferably between 1.5 and up to 4.5 M) of a perchlorate hydrate, possibly with another or other suitable monomers.

The following examples are by way of illustration only and are to be construed in a non-limitative manner. Degrees are degrees centigrade and parts are parts by weight. Molar concentrations are designed by M.

EXAMPLE 1

70 parts of a 2.8 M solution of iron perchlorate hydrate $Fe(ClO_4)_2 \cdot 6H_2O$ in acrylonitrile was mixed with 30 parts water, introduced into a water bath and maintained at a constant temperature of 50° for 70 hours. There was obtained a brown elastomeric material, M. W. about 100.000. The electrical conductivity of this material (D.C.) at 27° was: $10^{-1}$ $\Omega^{-1}$ cm.$^{-1}$. Young modulus $9.4 \times 10^7$ dyne/cm.$^2$; glass transition temperature $-22°$ C.

The activation energy for the conductivity was 0.5 ev.
The polymerization can be carried out at a greater speed by using a suitable catalyst, such as for example azo-bisisobutyronitrile. When used at a concentration of 1 g./l. the polymerization was completed after 24 hours. A material similar to that obtained above was obtained.

EXAMPLE 2

A 0.69 M solution of $Fe(ClO_4)_2 \cdot 6H_2O$ in acrylonitrile was polymerized (without addition of water) by maintaining at 50° during 70 hours.

There was obtained a green transparent, hard rubberlike material, specific conductivity at 27° $10^{-4}$ $\Omega^{-1}$ cm.$^{-1}$.

EXAMPLE 3

A 2.07 M solution of iron perchlorate (as used in Example 1) in acrylonitrile was polymerized at 50° during 70 hours to produce a rubberlike elastofer, green color, transparent, specific conductivity at 27°: $10^{-4}$ $\Omega^{-1}$ cm.$^{-1}$.

EXAMPLE 4

A 4.14 M solution of iron perchlorate (as in Example 1) in acrylonitrile was polymerized for 70 hours at 50° C.

There was obtained a soft rubberlike elastomer, specific conductivity at 27°; $10^{-4}\Omega^{-1}$ cm.$^{-1}$.

EXAMPLES 5–9

In the following Table there are given results obtained with various perchlorate hydrates:

TABLE I

| No. | Salt used— | Concentration, M | Color | Transparency | Rubberlike | Conductivity ($\Omega^{-1}$cm.$^{-1}$) |
|---|---|---|---|---|---|---|
| 5 | $Cr(ClO_4)_3 \cdot 6H_2O$ | 1.4 | Deep blue | − | + | $2.10^{-6}$ |
| 6 | $Mn(ClO_4)_2 \cdot 6H_2O$ | 1.4 | Translucent | + | + | $2.10^{-4}$ |
| 7 | $Co(ClO_4)_2 \cdot 6H_2O$ | 1.37 | Red | + | + | $5.10^{-5}$ |
| 8 | $Ni(ClO_4)_2 \cdot 6H_2O$ | 1.37 | Blue | + | + | $5.10^{-5}$ |
| 9 | $Cu(ClO_4)_2 \cdot 6H_2O$ | 1.35 | do | + | + | $1.10^{-3}$ |

EXAMPLES 10–12

A 1.5 M solution of $Co(ClO_4)_2 \cdot 6H_2O$ in 90 percent acrylonitrile and 10 percent styrene was polymerized by heating for 70 hours to 50°.

There was obtained a red elastomer which had rubberlike properties and which was transparent. The specific conductivity at 27° was: $10^{-5}$–$10^{-4}\Omega^{-1}$ cm.$^{-1}$.

The same procedure and concentrations of $$Ni(ClO_4)_2 \cdot 6H_2O$$

of $Fe(ClO_4)_2 \cdot 6H_2O$ resulted in blue and yellow elastomers, respectively. These too were transparent. The conductivity was the same as with the cobalt perchlorate in this Example.

EXAMPLE 13

90 Parts of 1.4 M solution of $Fe(ClO_4)_2 \cdot 6H_2O$ in acrylonitrile were mixed with 10 parts of 2-vinyl-pyridine monomer, introduced into a water bath at a constant temperature of 50° for 70 hours. There was obtained a yellow transparent elastomeric material. The electrical conductivity of this material at 27° was $5 \times 10^{-4}\Omega^{-1}$ cm.$^{-1}$.

EXAMPLE 14

90 Parts of 1.35 M solution of anhydrous $Zn(ClO_4)_2$ in acrylonitrile were mixed with 10 parts of water, introduced into a water bath at a constant temperature of 50° for 70 hours. There was obtained a translucent rubberlike conducting material. The conductivity of this material at 27° was $4 \times 10^{-4}\Omega^{-1}$ cm.$^{-1}$. This material exhibits light pipe properties.

EXAMPLES 15–18

In the following Table there are summarized results obtained with various perchlorate salts. The polymerization was effected at 50° for 70 hours. In addition to the rubberlike nature of the products and the transparency, these products also had the property of being efficient "Light Pipes." The transparency is similar to that of glass, and flexible rods of these products can be bent in curves and conduct light efficiently by multiple total internal reflections.

All these four products had rubberlike properties and could be easily bent. The last column in the Table gives the specific conductivity in $\Omega^{-1}$ cm.$^{-1}$.

TABLE II

| No. | Salt | Concentration, M | Color | "Light Pipe" | Conductivity ($\Omega^{-1}$cm.$^{-1}$) |
|---|---|---|---|---|---|
| 15 | $Mg(ClO_4)_2 \cdot 6H_2O$ | 1.5 | Yellowish | + | $2 \times 10^{-4}$ |
| 16 | $Ca(ClO_4)_2 \cdot 6H_2O$ | 1.44 | do | + | $2 \times 10^{-4}$ |
| 17 | $Zn(ClO_4)_2 \cdot 6H_2O$ | 1.34 | Translucent | + | $6 \times 10^{-5}$ |
| 18 | $Li(ClO_4)_2 \cdot 6H_2O$ | 3.2 | Yellowish | + | $3 \times 10^{-4}$ |

The substances produced according to Examples 6–12 and 15–18 are stable when exposed to air and light; when stored for one year the mechanical, the optical and the electrical properties did not change.

We claim:

1. An electrically conductive composition prepared by polymerizing a monomeric mixture containing at least about 90% of an acrylonitrile monomer in the presence of a perchlorate hydrate salt in the proportion of from 0.5 to 4.5 moles of said salt per mole of the acrylonitrile, and in the presence of an azo-bis-isobutyronitrile catalyst, the perchlorate hydrate salt being selected from the group consisting of the hydrates of lithium perchlorate, iron perchlorate, chromium perchlorate, manganese perchlorate, cobalt perchlorate, nickel perchlorate, copper perchlorate, magnesium perchlorate, calcium perchlorate and zinc perchlorate.

2. The composition of claim 1 wherein the monomeric mixture is a mixture of acrylonitrile and a comonomer selected from the group consisting of styrene and 2-vinylpyridine.

3. The composition of claim 1, wherein the perchlorate hydrate salt is admixed with the monomeric mixture in an amount of from 1.4 to 3.0 moles of said salt per mole of the acrylonitrile.

4. A light pipe, comprising the electrically conductive composition of claim 1.

5. A process for preparing an electrically conductive composition, which comprises polymerizing a monomeric mixture containing at least about 90% of an acrylonitrile monomer in the presence of a perchlorate hydrate salt in an amount of from 0.5 to 4.5 moles of said salt per mole of the acrylonitrile, the perchlorate hydrate salt being selected from the group consisting of lithium perchlorate, iron perchlorate, chromium perchlorate, manganese perchlorate, cobalt perchlorate, nickel perchlorate, copper perchlorate, magnesium perchlorate, calcium perchlorate and zinc perchlorate.

6. The process of claim 5, wherein the polymerization is carried out in the presence of an azo-bis-isobutyronitrile catalyst.

References Cited

UNITED STATES PATENTS 2,963,457  12/1960  Miller _____ 260—88.7
3,192,189  6/1965  Nakajima et al. ___ 260—88.7 R HARRY WONG, Jr., Primary Examiner U.S. Cl. X.R.

260—42, 42.53, 88.7 C, 88.7 E

PO-1050
(5/69)

UNITED STATES PATENT OFFICE
CERTIFICATE OF CORRECTION 484-4
Patent No. 3,845,026          Dated   October 29, 1974

Inventor(s) Isaac Michaeli and Shymon Reich

It is certified that error appears in the above-identified patent and that said Letters Patent are hereby corrected as shown below:

Column 3, line 20: "elastofer," should read -- elastomer,--.

Column 4, lines 60-61: "manganese perclorate," should read -- manganese perchlorate,--.

Signed and sealed this 7th day of January 1975.

(SEAL)
Attest:

McCOY M. GIBSON JR.
Attesting Officer

C. MARSHALL DANN
Commissioner of Patents

PO-1050
(5/69)

UNITED STATES PATENT OFFICE
CERTIFICATE OF CORRECTION

Patent No. 3,845,026  Dated October 29, 1974

Inventor(s) Isaac MICHAELI and Shymon REICH

It is certified that error appears in the above-identified patent and that said Letters Patent are hereby corrected as shown below:

Column 4, line 5 of claim 1: "0.5 to 4.5 moles of said salt per mole" should read -- 0.5 to 4.5 moles of said salt per liter --.

Column 4, line 3 of claim 3: "1.4 to 3.0 moles of said salt per mole" should read -- 1.4 to 3.0 moles of said salt per liter --.

Column 4, line 5 of claim 5: "0.5 to 4.5 moles of said salt per mole" should read -- 0.5 to 4.5 moles of said salt per liter --.

Signed and Sealed this twenty-sixth Day of August 1975

[SEAL]

Attest:

RUTH C. MASON  
*Attesting Officer*

C. MARSHALL DANN  
*Commissioner of Patents and Trademarks*